(12) United States Patent
DeMers et al.

(10) Patent No.: US 9,639,606 B2
(45) Date of Patent: May 2, 2017

(54) MUSICAL SOUNDTRACK MATCHING

(71) Applicant: Marmoset, LLC, Portland, OR (US)

(72) Inventors: Justin DeMers, Portland, OR (US); Ryan Matthew Wines, Portland, OR (US)

(73) Assignee: Marmoset, LLC, Portland, OR (US)

( * ) Notice: Subject to any disclaimer, the term of this patent is extended or adjusted under 35 U.S.C. 154(b) by 281 days.

(21) Appl. No.: 14/459,703

(22) Filed: Aug. 14, 2014

(65) Prior Publication Data
US 2015/0052435 A1 Feb. 19, 2015

Related U.S. Application Data

(60) Provisional application No. 61/865,976, filed on Aug. 14, 2013.

(51) Int. Cl.
G06F 17/30 (2006.01)
G06F 3/0481 (2013.01)
G06F 3/0482 (2013.01)

(52) U.S. Cl.
CPC ...... *G06F 17/30755* (2013.01); *G06F 3/0482* (2013.01); *G06F 3/04817* (2013.01); *G06F 17/30017* (2013.01); *G06F 17/30743* (2013.01); *G06F 17/30749* (2013.01)

(58) Field of Classification Search
CPC ............... G06F 3/0482; G06F 3/04817; G06F 17/30017; G06F 17/30743; G06F 17/30749
See application file for complete search history.

(56) References Cited

U.S. PATENT DOCUMENTS

| | | | |
|---|---|---|---|
| 6,528,715 B1 * | 3/2003 | Gargi | G10H 1/0033 84/615 |
| 2004/0199494 A1 * | 10/2004 | Bhatt | G06F 17/30017 |
| 2010/0031193 A1 * | 2/2010 | Stark | G06F 17/30861 715/810 |
| 2013/0024801 A1 * | 1/2013 | Leydon | G06F 17/30253 715/780 |

* cited by examiner

*Primary Examiner* — Aaron Lowenberger
(74) *Attorney, Agent, or Firm* — Alleman Hall McCoy Russell & Tuttle LLP

(57) ABSTRACT

A host computing device includes a communication subsystem for communicatively coupling the host computing device to one or more user computing devices. The host computing device includes a logic subsystem and a storage subsystem containing instructions executable by the logic subsystem to send a musical soundtrack matching graphical user interface to the one or more user computing devices. The musical soundtrack matching graphical user interface comprises a plurality of user-selectable musical arc descriptor selectors configured to receive input of a user-selected musical arc descriptor selection, wherein each of the user-selectable musical arc descriptor selectors corresponds to a different one of a plurality of musical arc characteristics. The musical soundtrack graphical user interface further includes a results region displaying one or more musical tracks that embody the user-selected musical arc descriptor selection.

14 Claims, 16 Drawing Sheets

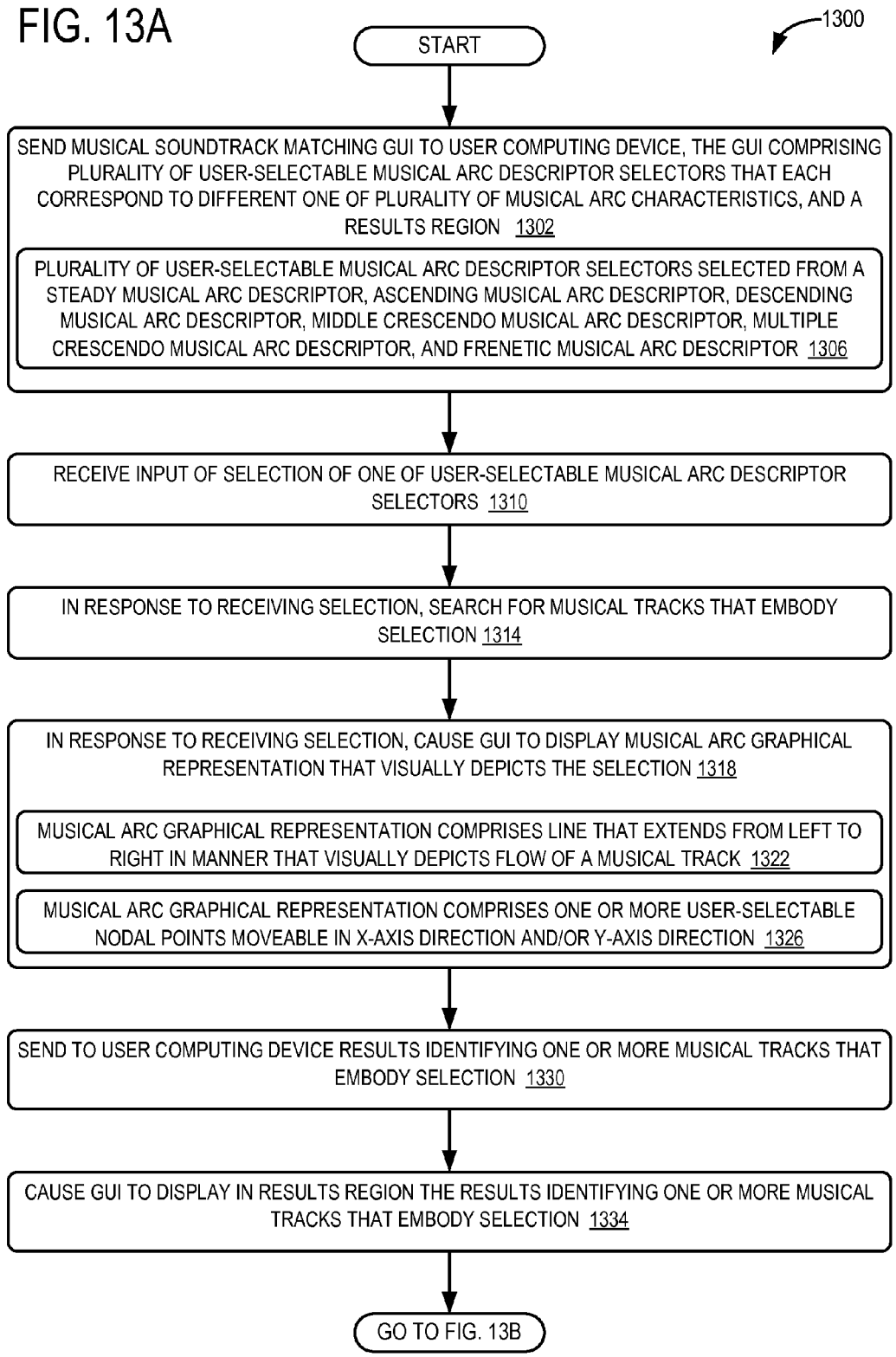

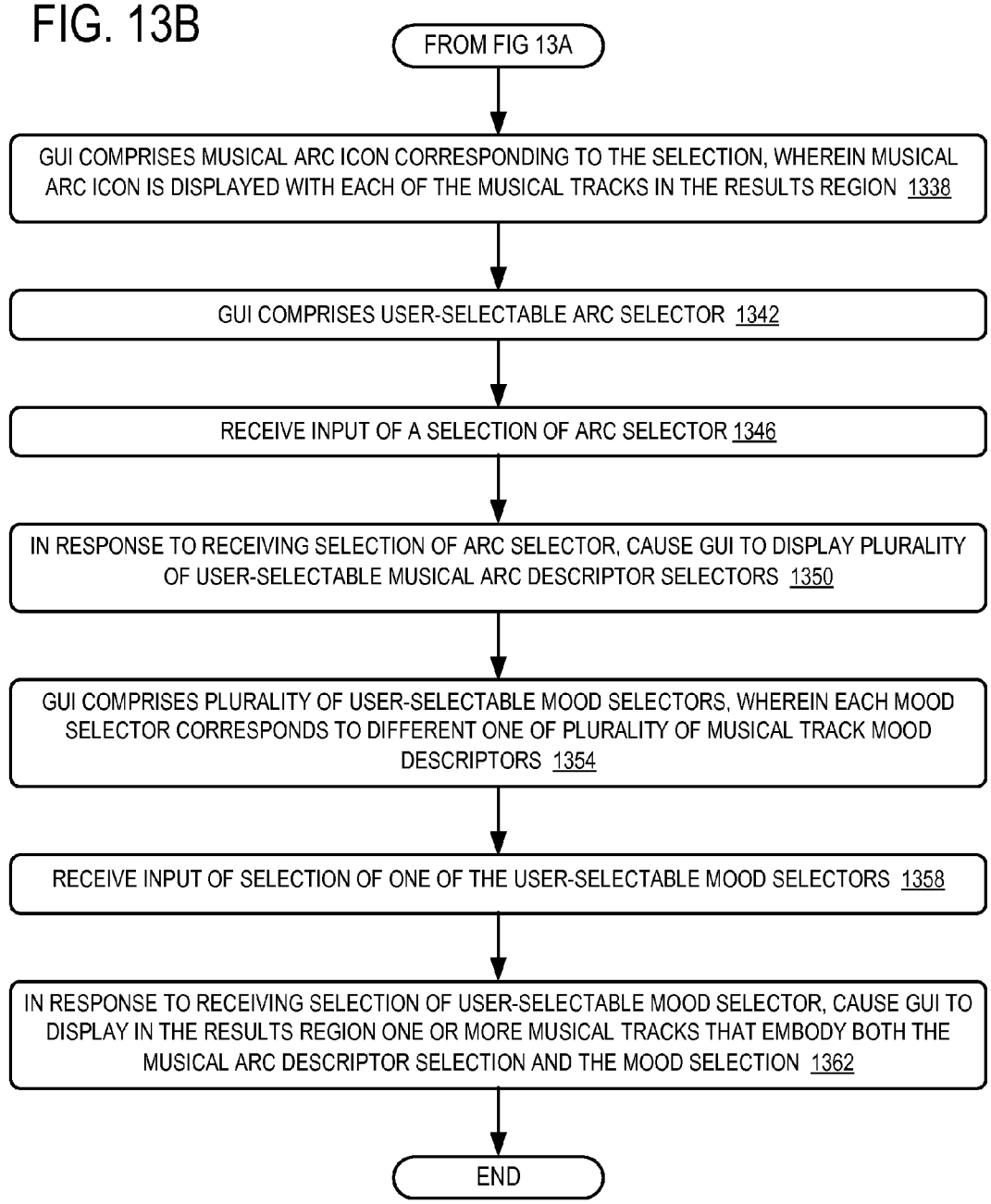

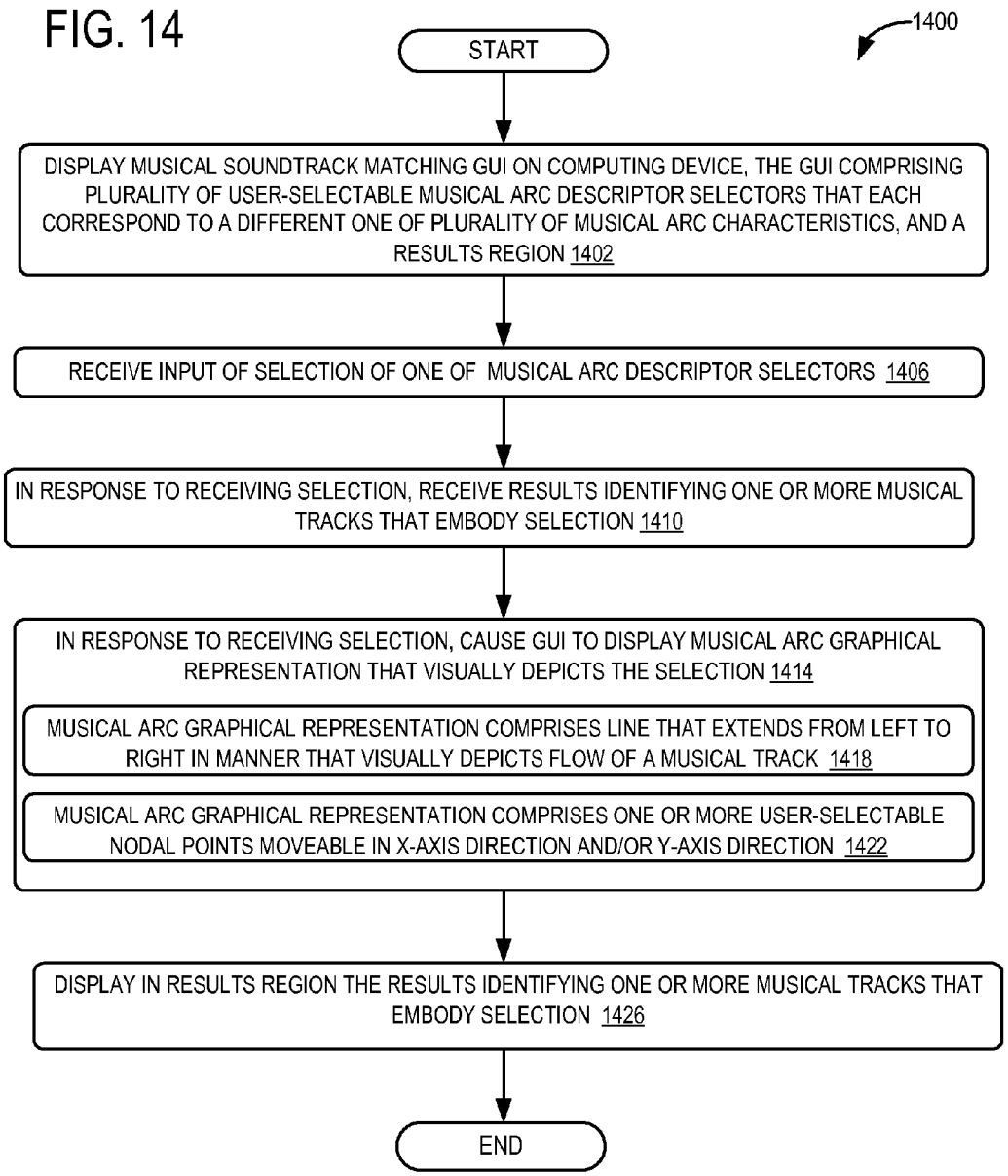

MUSICAL SOUNDTRACK MATCHING

CROSS REFERENCE TO RELATED APPLICATIONS

This application claims priority to U.S. Provisional Patent Application Ser. No. 61/865,976, filed Aug. 14, 2013 and entitled "MUSICAL SOUNDTRACK MATCHING," the entirety of which is hereby incorporated by reference for all purposes

BACKGROUND

Music has been matched to story since sound and image were combined decades ago. However, there has consistently existed an inherent conflict. The music industry spoke the musical language, and the image industry (including photographers, animators, and cinematographers) spoke the visual language of storytelling.

While there can be overlap, this disjointed understanding of image and sound has often resulted in haphazard pairings of story and soundtrack. Musical soundtracks may be chosen based on popularity or newness, or because they sound "cool" or close enough to a desired experience. The level of effectiveness of such combinations can range from weird to spectacular, depending on the level of experience, exposure, and attention to detail of the visual artist or music supervisor(s) making these choices. Further, artists and professional supervisors with a keen ear and understanding of story and sound often produce compelling pairings. On the other hand, inexperienced or hobby storytellers may have a passion for visuals, but may be handicapped with a limited understanding of the impact of a well-matched soundtrack.

Consider the following: songs typically have a single crescendo, multiple crescendos, or no crescendo at all. Some songs without a crescendo may have a relatively steady volume or intensity that stays generally consistent over the track. Some songs without a crescendo may begin with relatively high volume or intensity that generally decreases over the track. Other songs may begin with relatively low volume or intensity that increases over the track. Still other songs may embody a volume or intensity that varies randomly over the track. These and other musical characteristics of volume and/or intensity over time may be referred to as musical arcs. Likewise, films and video have their major emotional or impactful moments, and filmmakers often want to highlight these moments as significant through a corresponding soundtrack. Such emotional or impactful moments of film and video may be referred to as story arcs.

For higher budget productions, custom composers may be utilized to marry the musical arcs with the story arcs by crafting original scores. These custom songs naturally hit on significant parts of the film, creating an incredibly powerful experience for viewers. However, custom compositions can become prohibitively expensive to commission, particularly for smaller budget and resource-constrained productions and artists. Commissioning a custom composition can also impact the production schedule of a creative project, particularly when using the most skilled composers who are in high demand and have significant lead times.

SUMMARY

Various examples are disclosed herein that relate to providing a musical soundtrack graphical musical interface. For example, one disclosed example provides a host computing device comprising a communication subsystem for communicatively coupling the host computing device to one or more user devices. The host computing device includes a logic subsystem and a storage subsystem containing instructions that are executable by the logic subsystem to send a musical soundtrack matching graphical user interface (GUI) to the one or more user devices.

The musical soundtrack matching GUI may comprise a plurality of user-selectable musical arc descriptor selectors that are each configured to receive input of a user-selected musical arc descriptor selection. Each of the user-selectable musical arc descriptor selectors also corresponds to a different one of a plurality of musical arc characteristics. The musical soundtrack matching GUI may also comprise a results region in which one or more musical tracks that embody the user-selected musical arc descriptor selection may be displayed.

In another example, a method for providing a musical soundtrack matching GUI to a user computing device is provided. The method may comprise sending the musical soundtrack matching GUI to the user computing device. The musical soundtrack matching GUI may comprise a plurality of user-selectable musical arc descriptor selectors that each correspond to a different one of a plurality of musical arc characteristics, and a results region.

Input of a musical arc descriptor selection of one of the user-selectable musical arc descriptor selectors may be received. In response to receiving the musical arc descriptor selection, the method may include searching for one or more musical tracks that embody the musical arc descriptor selection. Results identifying the one or more musical tracks that embody the musical arc descriptor selection may be sent to the user computing device. The musical soundtrack matching GUI may be controlled to display in the results region the results identifying the one or more musical tracks that embody the musical arc descriptor selection.

In another example, a method for providing a musical soundtrack GUI is provided. The method may comprise displaying the musical soundtrack matching GUI on a user computing device. The musical soundtrack matching GUI may comprising a plurality of user-selectable musical arc descriptor selectors that each correspond to a different one of a plurality of musical arc characteristics, and a results region. Input of a musical arc descriptor selection of one of the user-selectable musical arc descriptor selectors may be received. In response to receiving the musical arc descriptor selection, results may be received that identify one or more musical tracks that embody the musical arc descriptor selection. The results may then be displayed in the results region.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 13A and 13B are a flow chart of a method for providing a musical soundtrack matching graphical user interface to a user computing device according to an example of the present disclosure.

FIG. 14 is a flow chart of a method for providing a musical soundtrack matching graphical user interface according to an example of the present disclosure.

DETAILED DESCRIPTION

The present disclosure provides computing devices and methods that enable users to easily locate and match one or more existing musical tracks with the user's visual story in a way that users may clearly visualize and understand. More particularly, the present disclosure provides a musical soundtrack matching graphical user interface (GUI) that provides a user with simple visual depictions of various musical arcs that enable a user to intuitively find and select matching soundtracks that can make a deep impact on storytelling.

Figure 1:
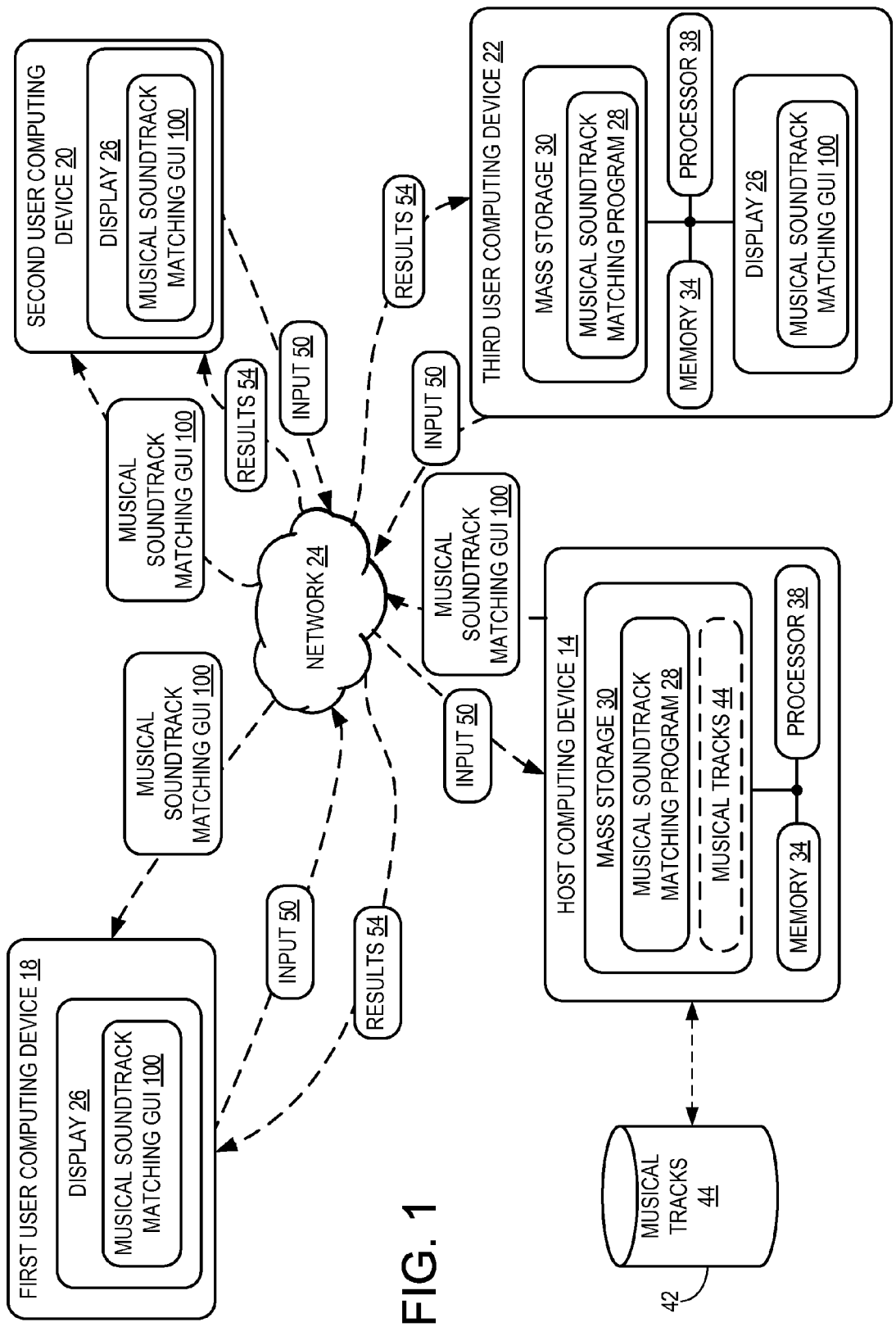
FIG. 1 is a schematic view of a host computing device and user computing devices according to an example of the present disclosure.

FIG. 1 shows a schematic view of an example use case environment in which one or more aspects of the present disclosure may be utilized. In the example of FIG. 1, a host computing device 14 is communicatively coupled with a first user computing device 18, second user computing device 20, and third user computing device 22 via network 24. As described in more detail below, each of the user computing devices may include a display 26 that displays a musical soundtrack matching GUI 100. Network 24 may take the form of a local area network (LAN), wide area network (WAN), wired network, wireless network, personal area network, or a combination thereof, and may include the Internet. It will be appreciated that in other examples, the host computing device 14 may be communicatively coupled with fewer or more user computing devices.

Host computing device 14 may be configured with program instructions according to examples of the present disclosure. Such program instructions may implement one or more of the methods and processes described in more detail below. In the example of FIG. 1, host computing device 14 includes a musical soundtrack matching program 28 that may be stored in mass storage 30 of the host computing device. The musical soundtrack matching program 28 may be loaded into memory 34 and executed by a processor 38 of the host computing device 14 to perform one or more of the methods and processes described in more detail below.

The host computing device 14 may take the form of a network computing device such as a server, desktop computing device, mobile computing device such as a smart phone, laptop, notebook or tablet computer, or other suitable type of computing device. Additional details regarding the components and computing aspects of the host computing device 14 are described in more detail below with reference to FIG. 15.

The host computing device 14 may be communicatively coupled to a database 42 that contains a plurality of musical tracks 44 having various musical characteristics, including but not limited to arc, mood, energy, length, vocals, instruments, genres, and popularity. The musical tracks 44 may be stored in any suitable file format such as, for example, .mp3, .wav, .aiff, MPEG-4, PCM, or any other suitable format. In other examples, and in addition to or instead of the database 42, musical tracks 44 may be stored in mass storage 30 of the host computing device 14.

As described in more detail below, the audible form of each track may be transformed into a visual representation that may correspond to the flow of a story. In one example, each track is analyzed to determine the rises, falls, and/or other characteristics of the volume and/or intensity of the music. Such characteristics may be mapped to one of a plurality of descriptive categories that describe distinctive musical arcs. For each of these musical arc categories, a simple graphical representation of the musical arc of the category may be generated and displayed to a user via the musical soundtrack matching GUI 100.

As described in more detail below, a user searching for a musical track to match the user's film, video, story, character, etc., may utilize the musical soundtrack matching GUI 100 to search a database of musical tracks 44 by specifying one or more desired characteristics of the track. Advantageously, by enabling the user to search by a desired musical arc, the present disclosure allows the user to easily locate a musical track having a musical arc that matches the story arc of the user's story. Further, by providing an intuitive, visual, graphical representation of one or more available musical arcs, the user may easily find the musical track that will resonate at the most impactful moment(s) in their story, and at just the right time.

Aspects of this disclosure will now be described with reference to illustrated example screens of a musical soundtrack matching GUI 100 displayed on a user computing device. As illustrated in FIG. 1, in some examples the musical soundtrack matching GUI 100 may be generated by host computing device 14 and sent to one or more user computing devices, such as first user computing device 18 and second user computing device 20. In some examples, the musical soundtrack matching GUI 100 may comprise a dynamic web page that may be displayed by such devices via, for example, a web browser. As described in more detail below, a user may provide input 50 to host computing device 14 via one or more selectors and/or other user-selectable aspects of the musical soundtrack matching GUI 100. Using such input 50, the musical soundtrack matching program 28 may search for musical tracks 44 that match the user's input, and may correspondingly modify a results region of the musical soundtrack matching GUI 100 to display results 54 that identify one or more musical tracks 44 corresponding to the user's input.

In other examples, the musical soundtrack matching program 28 may be stored in mass storage 30 of a user computing device, such as third user computing device 22. The musical soundtrack matching program 28 may be loaded into memory 34 and executed by a processor 38 of the third user computing device 22 to perform one or more of the methods and processes described in more detail below. In these examples, third user computing device 22 may be configured with program instructions according to examples of the present disclosure. Such program instructions may implement one or more of the methods and processes described in more detail below. As shown in FIG. 1, in this example the musical soundtrack matching program 28 may generate the musical soundtrack matching GUI 100, send input 50 to host computing device 14, and receive results 54 from the host computing device.

In various examples, the user computing devices may take the form of a desktop computing device, mobile computing device such as a smart phone, laptop, notebook or tablet computer, or other suitable type of computing device. Additional details regarding the components and computing aspects of the user computing devices are described in more detail below with reference to FIG. 15.

Figure 2:
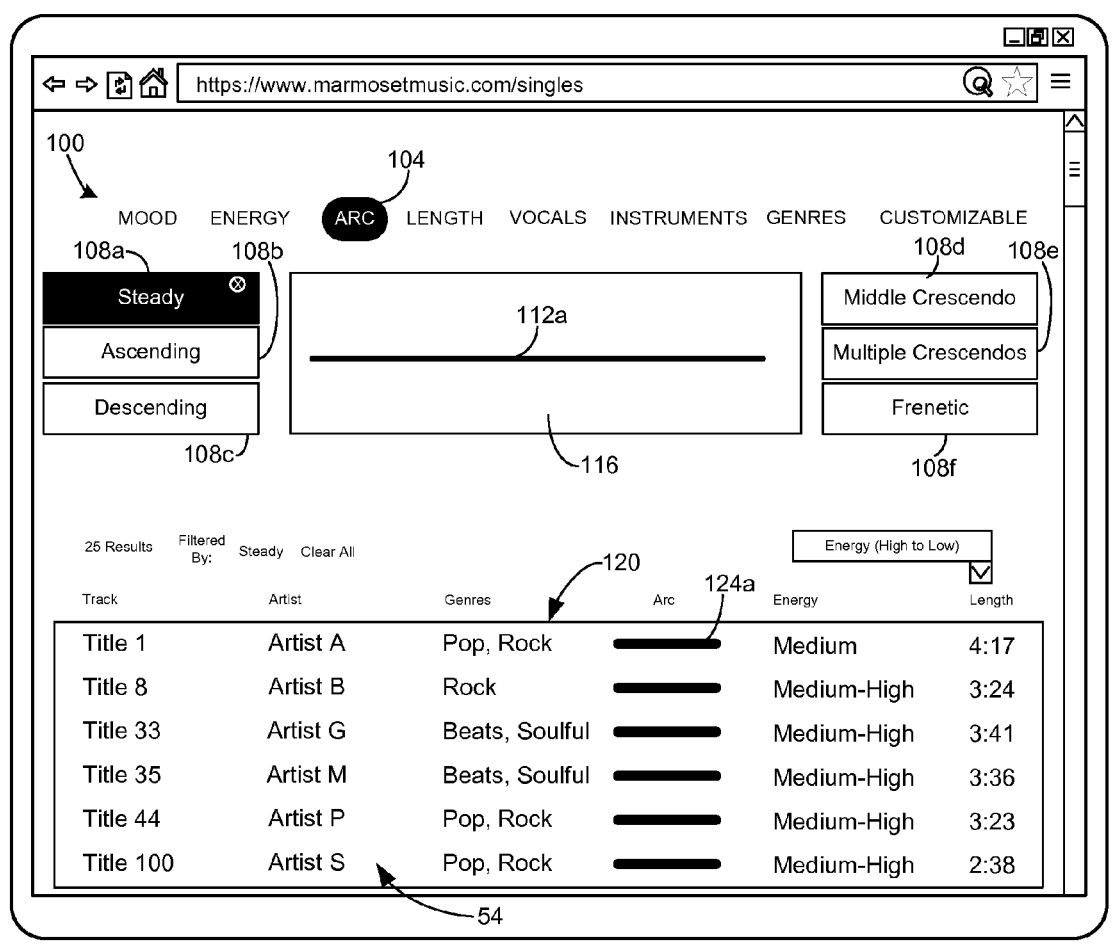
FIG. 2 is a schematic view of a musical soundtrack matching graphical user interface displayed on a user computing device according to an example of the present disclosure.

With reference now to FIG. 2, a schematic illustration of an example screen of a musical soundtrack matching GUI 100 according to an example of the present disclosure is provided. As noted above, the musical soundtrack matching program 28 may be configured to enable a user to search for and locate a musical track that includes a musical arc matching a story arc of the user's story. As shown in the example of FIG. 2, the musical soundtrack matching GUI 100 may include a user-selectable arc selector 104 that may be selected by a user. When the arc selector 104 is selected, the musical soundtrack matching GUI 100 may display a plurality of musical arc descriptor selectors 108 that each correspond to a different musical arc characteristic.

In the example of FIG. 2, the musical soundtrack matching GUI 100 displays a steady musical arc descriptor selector 108a, an ascending musical arc descriptor selector 108b, a descending musical arc descriptor selector 108c, a middle crescendo musical arc descriptor selector 108d, a multiple crescendos musical arc descriptor selector 108e, and a frenetic musical arc descriptor selector 108f. In FIG. 1 the steady musical arc 108a has been selected by a user. A steady musical arc may correspond to music that has no major rises or falls in volume or intensity. The music may flow at a steady rhythm and a steady pace. For a storyteller user, this arc may be desired for subtle soundtracks or for use behind voice overs and narrative.

When the steady musical arc selector 108a is selected, a musical arc graphical representation corresponding to a steady musical arc may be displayed. In the example of FIG. 2, the steady musical arc graphical representation 112a comprises a straight, horizontal line extending from left to right within a track box 116. The steady musical arc graphical representation 112a visually depicts a steady, consistent musical arc that may be quickly and easily understood by the user.

When the steady musical arc selector 108a is selected, the musical soundtrack matching program 28 searches database 42, mass storage 30 and/or one or more other databases for musical tracks 44 that embody a steady musical arc. In some examples, the files for such musical tracks 44 may be tagged to identify the tracks as embodying a steady musical arc. In other examples, the musical soundtrack matching program 28 may analyze the stored musical tracks by, for example, examining the waveforms created by the music to programmatically identify tracks that exhibit characteristics of a steady musical arc.

Upon locating those tracks embodying a steady musical arc, the host computing device 14 sends results 54 identifying those tracks to the user computing device. Such results 54 are then displayed in a results region 120 of the musical soundtrack matching GUI 100. In some examples, each of the tracks displayed in the results region 120 may also be displayed with a steady musical arc icon 124a that corresponds to the steady musical arc graphical representation 112a. As shown in the example of FIG. 2, in some examples the results 54 may include the title and artist of each track that embodies a steady musical arc. In some examples, a genre, energy and length of each track may also be displayed.

Figure 3:
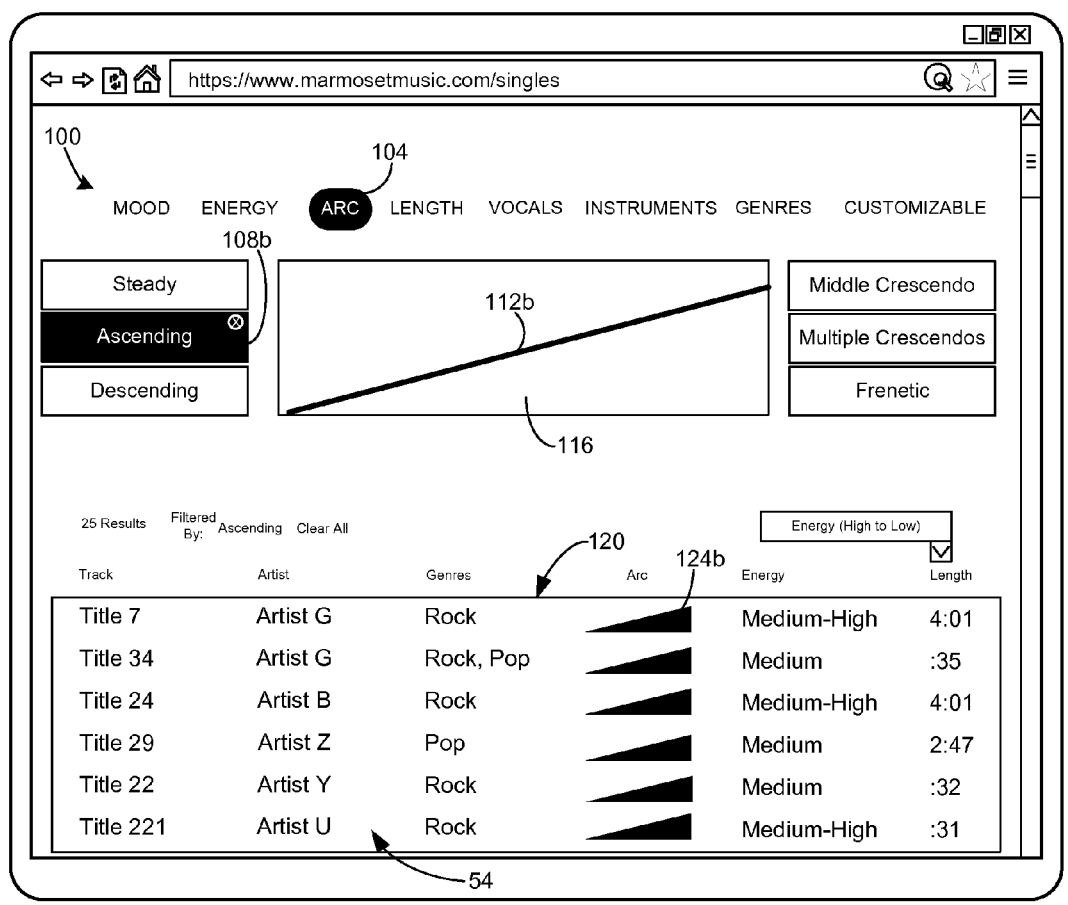
FIG. 3 is a schematic view of a musical soundtrack matching graphical user interface displayed on a user computing device according to another example of the present disclosure.

With reference now to FIG. 3, an ascending musical arc selector 108b has been selected. An ascending musical arc may correspond to music that generally builds in intensity and/or volume, becoming more powerful until it peaks at or near the end of the track. For the storyteller, this arc may be preferred for stories that end in cheering, first pumping, charged emotions, or those shining moments leading to a final climactic ending.

When the ascending musical arc selector 108b is selected by a user, a musical arc graphical representation corresponding to an ascending musical arc may be displayed. In the example of FIG. 3, the ascending musical arc graphical representation 112b comprises a straight line sloped upwardly from left to right within the track box 116. The ascending musical arc graphical representation 112b visually depicts an ascending musical arc that may be quickly and easily understood by the user.

When the ascending musical arc selector 108b is selected, the musical soundtrack matching program 28 searches database 42, mass storage 30 and/or one or more other databases for musical tracks 44 that embody an ascending musical arc. Those musical tracks 44 embodying an ascending musical arc are then displayed in the results region 120 of the musical soundtrack matching GUI 100. In some examples, each of the tracks displayed in the results region 120 may also be displayed with an ascending musical arc icon 124b that corresponds to the ascending musical arc graphical representation 112b.

Figure 4:
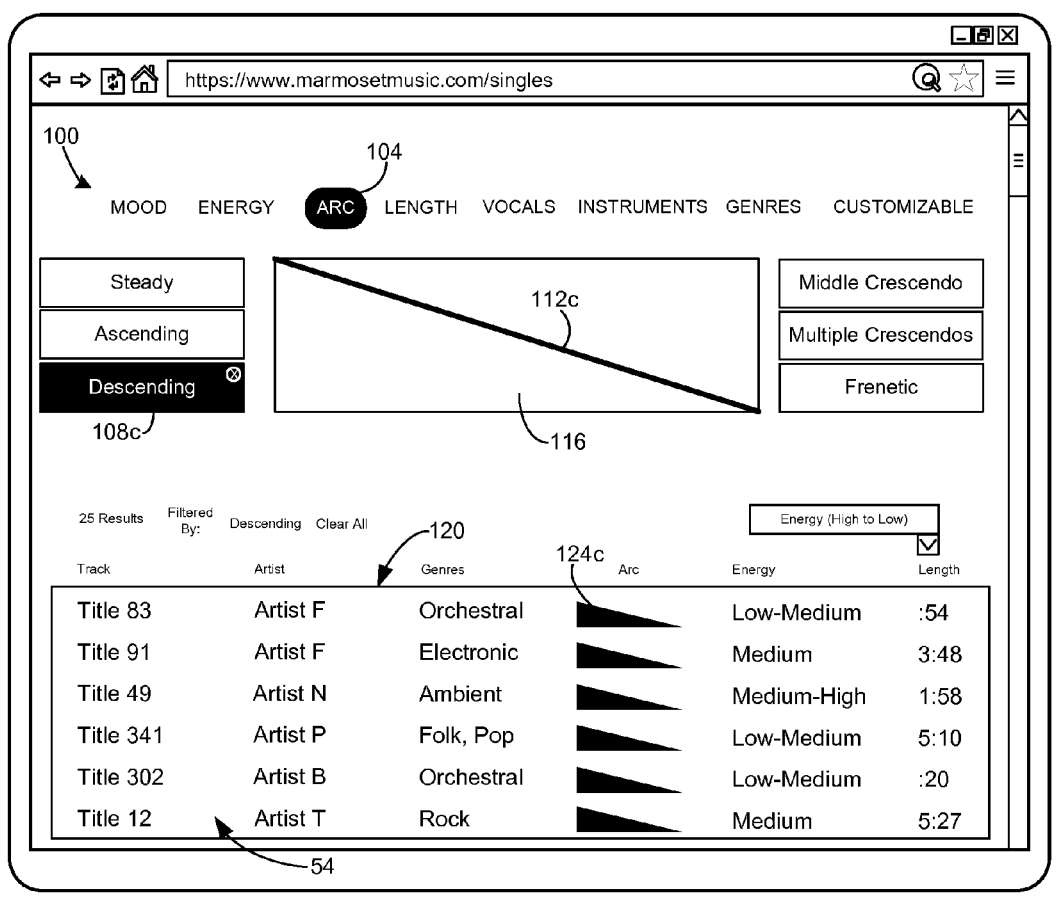
FIG. 4 is a schematic view of a musical soundtrack matching graphical user interface displayed on a user computing device according to another example of the present disclosure.

With reference now to FIG. 4, a descending musical arc selector 108c has been selected. A descending musical arc may correspond to music that begins with a big or full sound and then slowly continues to wind down to the end of the track. For the storyteller, this musical arc may be preferred for stories where the major premise is presented at the start and comprises a defining moment, and where subsequent parts of the story support that big introduction.

When the descending musical arc selector 108c is selected, a musical arc graphical representation corresponding to a descending musical arc may be displayed. In the example of FIG. 4, the descending musical arc graphical representation 112c comprises a straight line sloped downwardly from left to right within the track box 116. The descending musical arc graphical representation 112c visually depicts a descending musical arc that may be quickly and easily understood by the user.

When the descending musical arc selector 108c is selected, the musical soundtrack matching program 28 searches database 42, mass storage 30 and/or one or more other databases for musical tracks 44 that embody a descending musical arc. Those musical tracks 44 embodying a descending musical arc are then displayed in the results region 120 of the musical soundtrack matching GUI 100. In some examples, each of the tracks displayed in the results region 120 may also be displayed with a descending musical arc icon 124c that corresponds to the descending musical arc graphical representation 112c.

Figure 5:
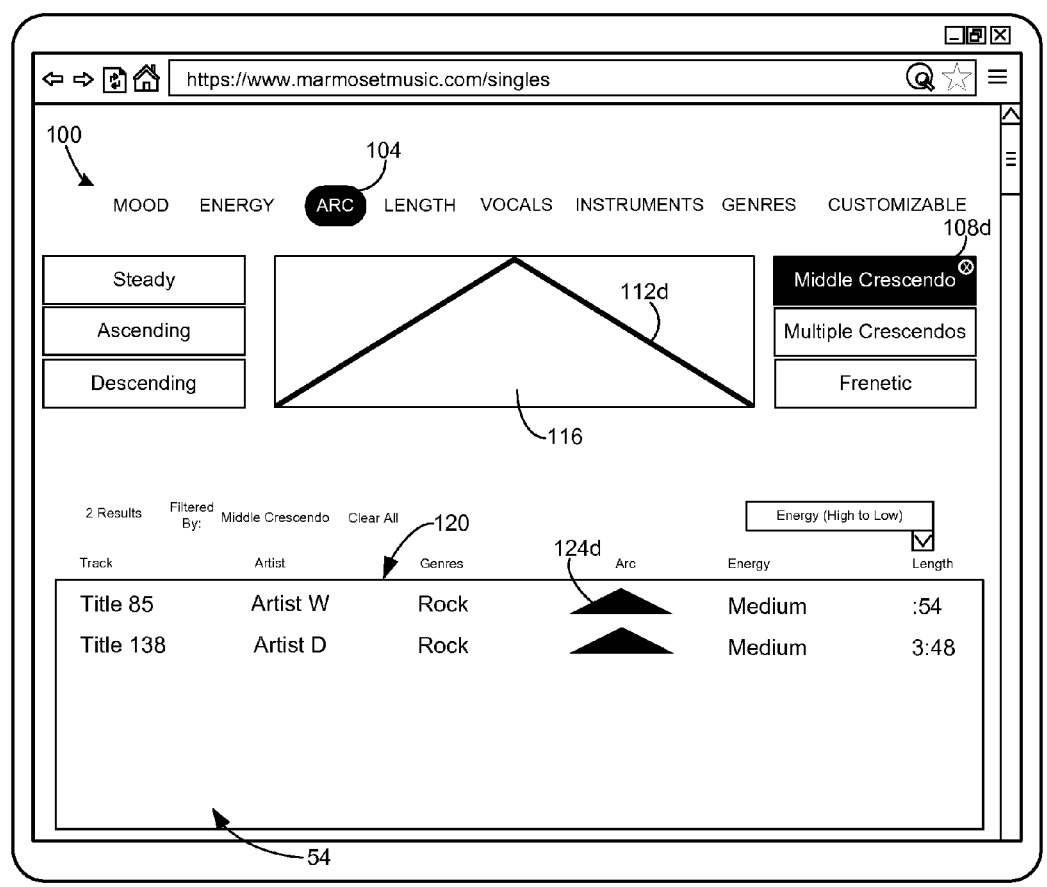
FIG. 5 is a schematic view of a musical soundtrack matching graphical user interface displayed on a user computing device according to another example of the present disclosure.

With reference now to FIG. 5, a middle crescendo musical arc selector 108d has been selected. A middle crescendo musical arc may correspond to music in which a crescendo is reached near the middle of the song, with a generally even rise and fall on either side. For the storyteller, this arc may be preferred for stories that build to a climax, and then have a relatively even span of time to flow down into the conclusion.

When the middle crescendo musical arc selector 108d is selected, a musical arc graphical representation corresponding to a middle crescendo musical arc may be displayed. In the example of FIG. 5, the middle crescendo musical arc graphical representation 112d comprises a line sloping upwardly to an apex near the middle of the track box 116, and then downwardly from the apex to an end point in the bottom right of the track box. The middle crescendo musical arc graphical representation 112d visually depicts a uniformly rising and falling musical arc that may be quickly and easily understood by the user.

When the middle crescendo musical arc selector 108d is selected, the musical soundtrack matching program 28 searches database 42, mass storage 30 and/or one or more other databases for musical tracks 44 that embody a middle crescendo musical arc. Those musical tracks 44 embodying a middle crescendo musical arc are then displayed in the results region 120 of the musical soundtrack matching GUI 100. In some examples, each of the tracks displayed in the results region 120 may also be displayed with a middle crescendo musical arc icon 124d that corresponds to the descending musical arc graphical representation 112d.

Figure 6:
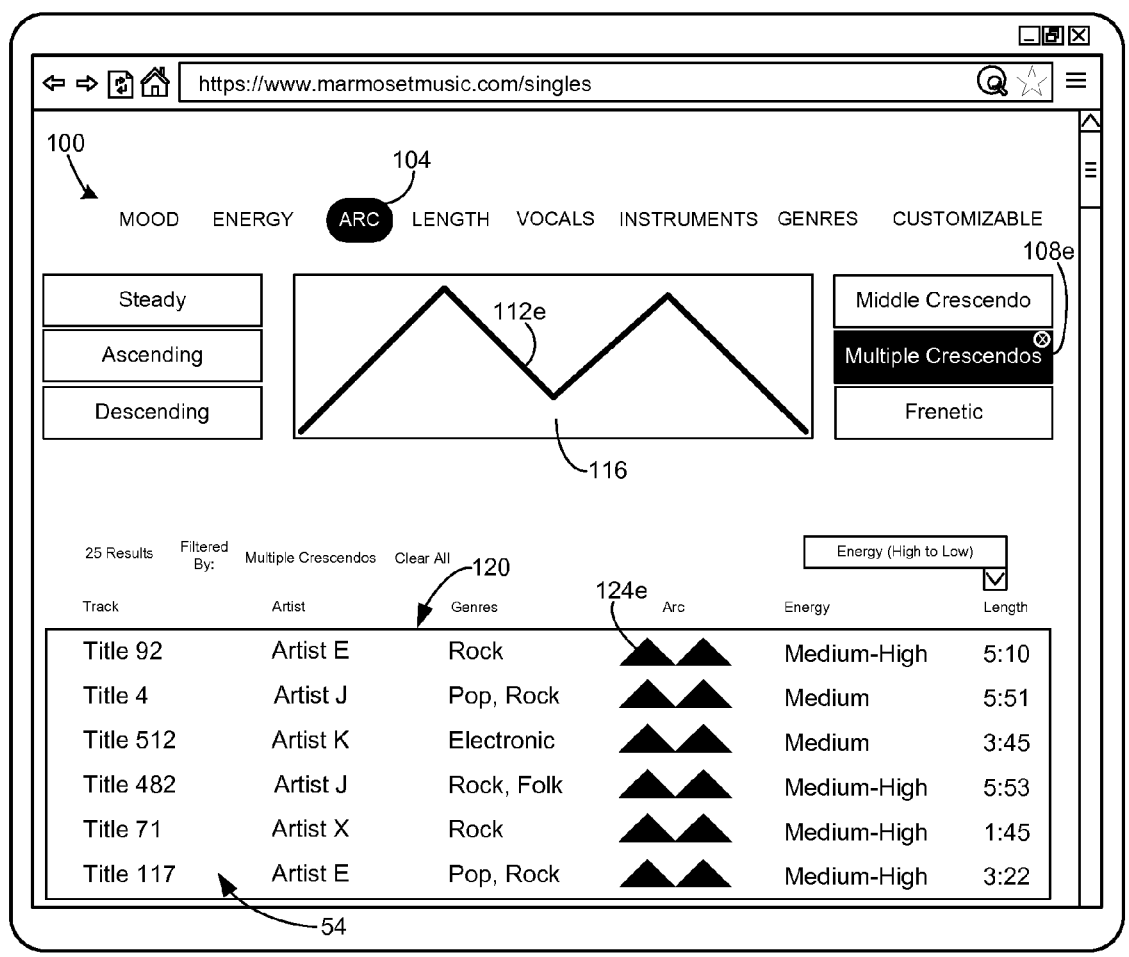
FIG. 6 is a schematic view of a musical soundtrack matching graphical user interface displayed on a user computing device according to another example of the present disclosure.

With reference now to FIG. 6, a multiple crescendo musical arc selector 108e has been selected. A multiple crescendo musical arc may correspond to music that contains multiple major crescendos with major rises and falls. For the storyteller, this arc may be preferred for stories that are like yo-yos, with multiple major moments happening during the course of their story.

When the multiple crescendo musical arc selector 108e is selected, a musical arc graphical representation corresponding to a multiple crescendo musical arc may be displayed. In the example of FIG. 5, the multiple crescendo musical arc graphical representation 112e comprises a line sloping upwardly and downwardly from left to right to form an "M" shape. The multiple crescendo musical arc graphical representation 112e visually depicts a musical arc that rises and falls multiple times and may be quickly and easily understood by the user.

When the multiple crescendo musical arc selector 108e is selected, the musical soundtrack matching program 28 searches database 42, mass storage 30 and/or one or more other databases for musical tracks 44 that embody a multiple crescendo musical arc. Those musical tracks 44 embodying a multiple crescendo musical arc are then displayed in the results region 120 of the musical soundtrack matching GUI 100. In some examples, each of the tracks displayed in the results region 120 may also be displayed with a multiple crescendo musical arc icon 124e that corresponds to the multiple crescendo musical arc graphical representation 112e.

Figure 7:
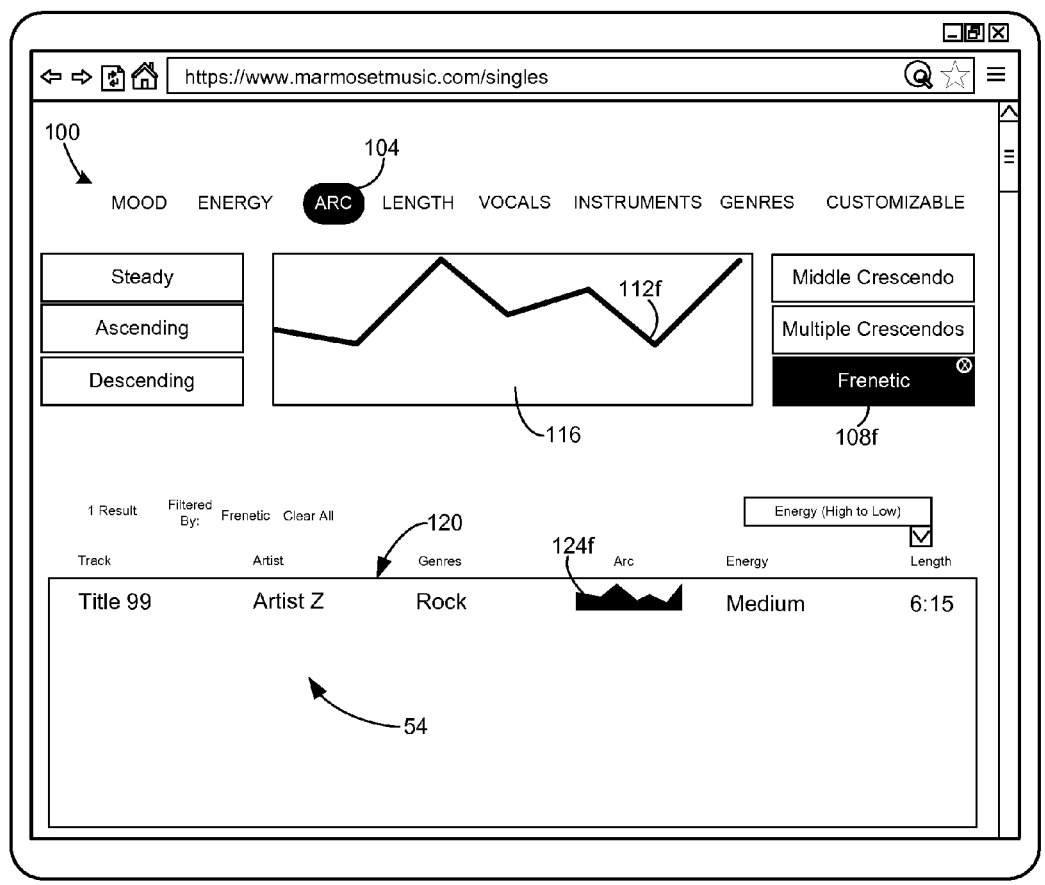
FIG. 7 is a schematic view of a musical soundtrack matching graphical user interface displayed on a user computing device according to another example of the present disclosure.

With reference now to FIG. 7, a frenetic musical arc selector 108f has been selected. A frenetic musical arc may correspond to music that embodies a musical arc that is opposite to a steady musical arc. The frenetic arc rises and falls randomly and perhaps unpredictably from start to finish. For the storyteller, this arc may be preferred for stories that are unsteady and keep the viewer guessing from start to finish.

When the frenetic musical arc selector 108f is selected, a musical arc graphical representation corresponding to a frenetic musical arc may be displayed. In the example of FIG. 7, the frenetic musical arc graphical representation 112f comprises a line sloping upwardly and downwardly at periodic, random points from left to right across the track box. The frenetic musical arc graphical representation 112f visually depicts a musical arc that rises and falls at random, periodic times and may be quickly and easily understood by the user.

When the frenetic musical arc selector 108f is selected, the musical soundtrack matching program 28 searches database 42, mass storage 30 and/or one or more other databases for musical tracks 44 that embody a frenetic musical arc. Those musical tracks 44 embodying a frenetic musical arc are then displayed in the results region 120 of the musical soundtrack matching GUI 100. In some examples, each of the tracks displayed in the results region 120 may also be displayed with a frenetic musical arc icon 124f that corresponds to the frenetic musical arc graphical representation 112f.

It will be appreciated that in other examples, fewer or additional musical arcs and corresponding selectors having different characteristics may also be provided and utilized by the musical soundtrack matching program 28, and all such examples are within the scope of the present disclosure.

Figure 8:
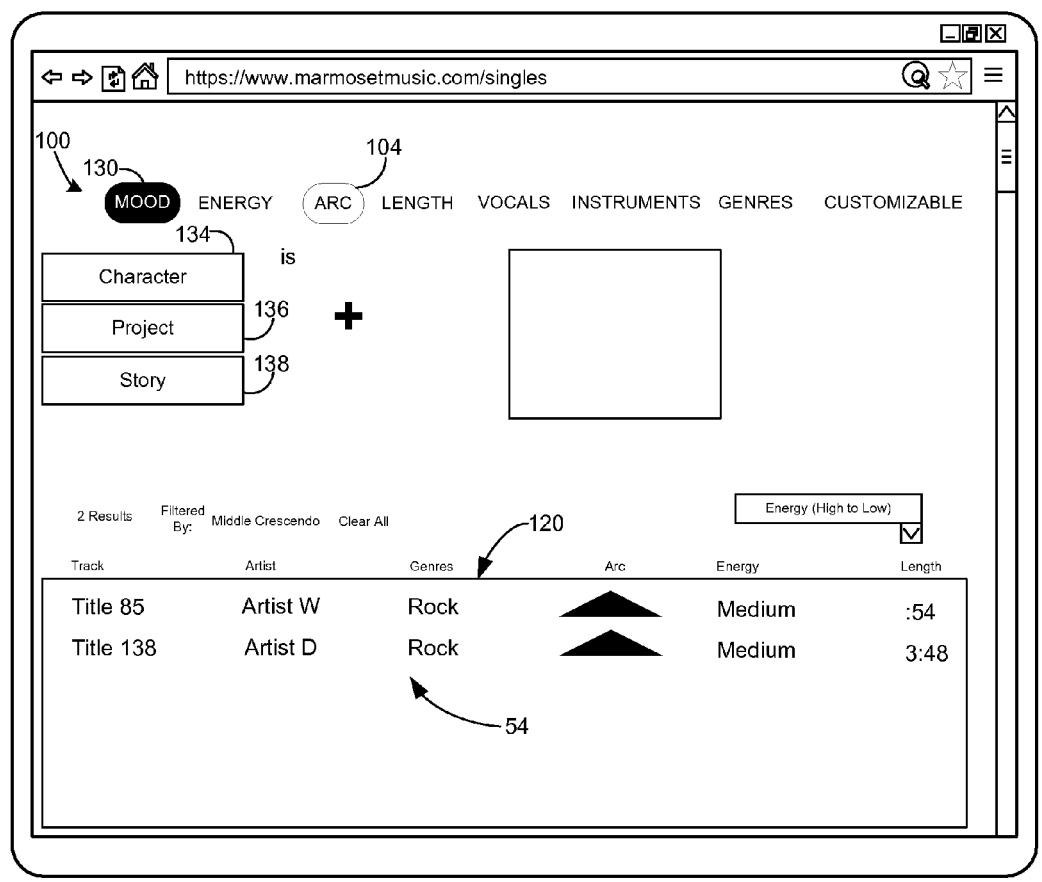
FIG. 8 is a schematic view of a musical soundtrack matching graphical user interface displayed on a user computing device according to another example of the present disclosure.

While a musical arc may drive the flow of the story, a user may further refine his or her search for one or more musical tracks 44 by specifying one or more additional track characteristics. For example and with reference to FIG. 8, in some examples the musical soundtrack matching GUI 100 may include a mood selector 130. When a user selects the mood selector 130, the musical soundtrack matching GUI 100 may then display a plurality of user-selectable subject selectors that are configured to receive input of a user-selected subject selection. The user may then select the subject of the user's creative work via a menu of choices. In the example of FIG. 8, the musical soundtrack matching GUI 100 displays a menu of user-selectable subject selectors that include character 134, project 136, and story 138.

Figure 9:
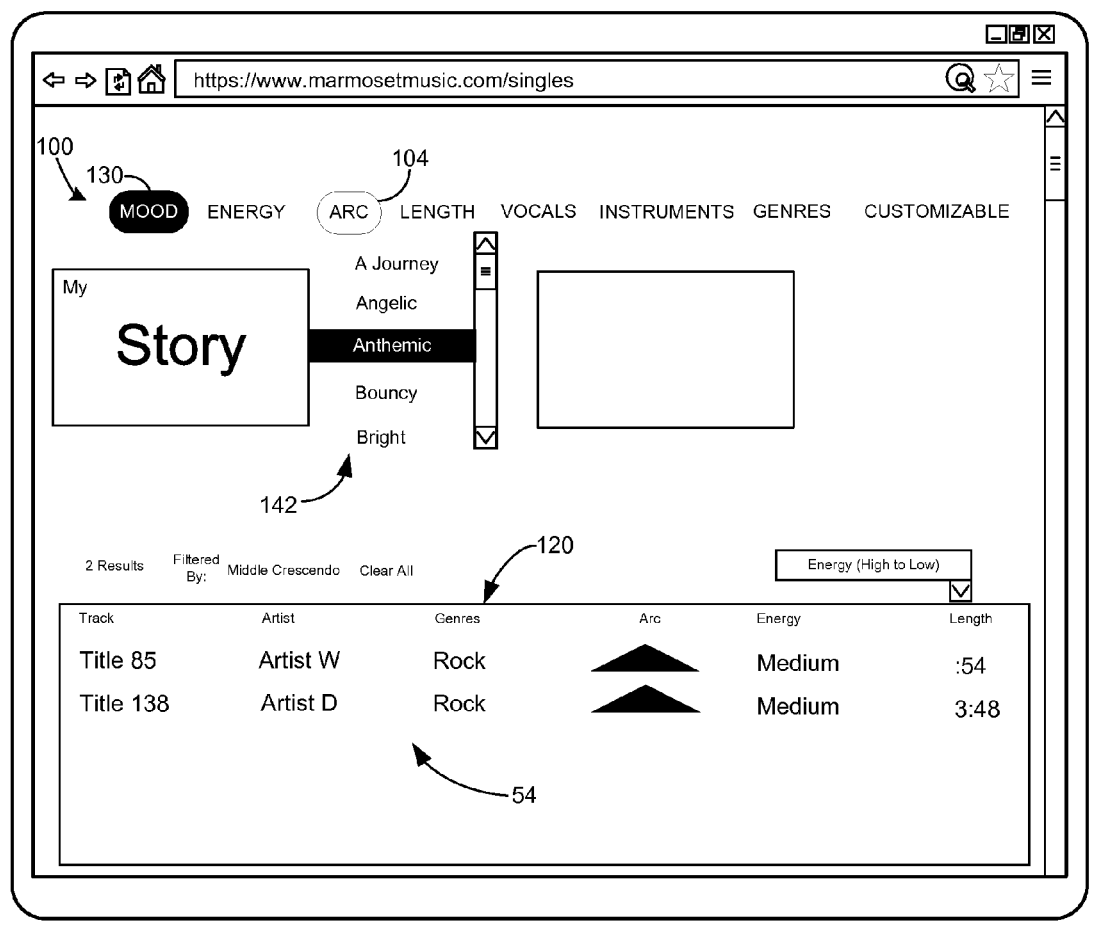
FIG. 9 is a schematic view of a musical soundtrack matching graphical user interface displayed on a user computing device according to another example of the present disclosure.

With reference now to the example FIG. 9, in this example the user has selected the story selector 138. Once the user selects the story selector 138, the musical soundtrack matching GUI 100 displays another menu of track mood descriptors 142 from which the user may select an appropriate mood descriptor. The menu of mood descriptors may include, for example, A Journey, Angelic, Anthemic, Bouncy, Bright, Dark, Dynamic, Energetic, Ethereal, and a variety of other suitable track mood descriptors. Each of the mood descriptors 142 describes a mood or emotional feel of a musical track.

Figure 10:
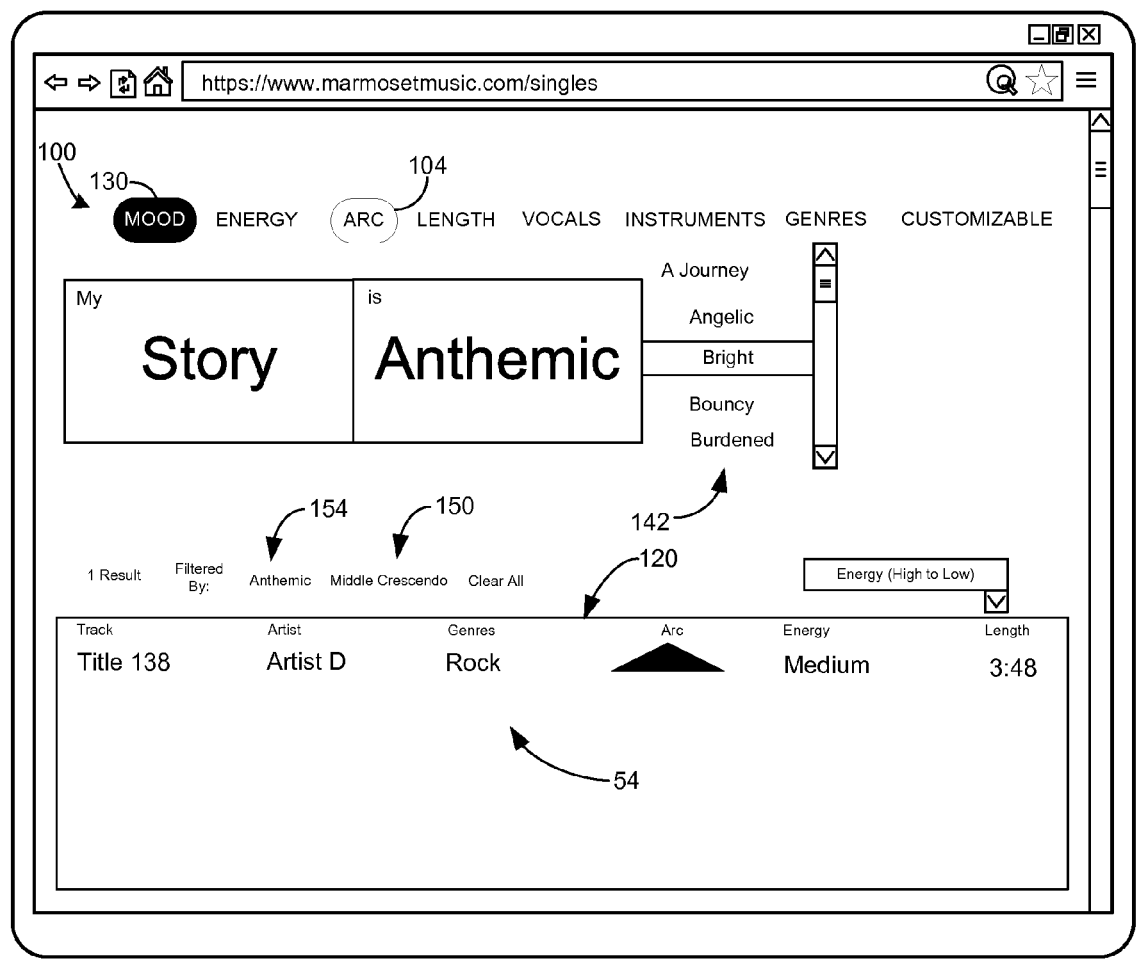
FIG. 10 is a schematic view of a musical soundtrack matching graphical user interface displayed on a user computing device according to another example of the present disclosure.

With reference now to the example of FIG. 10, when a user selects one of the mood descriptors 142, such as Anthemic, another menu of track mood descriptors 142 comprising the same list or a different list of mood descriptors may be offered to the user. If desired, the user may display the second list of mood descriptors 142 and select an additional mood descriptor. One or more additional menus may also be provided in a similar manner.

Upon each selection of one or more desired track mood descriptors 142, the musical soundtrack matching program 28 identifies those musical tracks that embody each of the selected mood descriptors, as well as the selected musical arc and any other track characteristics selected by the user. For example and with reference again to FIG. 10, the musical soundtrack matching program 28 has identified one musical track, "Title 138" by Artist D, that embodies both the user-selected middle crescendo musical arc descriptor selector, as indicated at 150, and the Anthemic mood selector, as indicated at 154.

In some examples and depending on whether the user selected a character 134, project 136, or story 138 as the subject of the user's creative work, the musical soundtrack matching GUI 100 may display different lists of mood descriptors 142 that correspond to a character, project, or story. In some examples, when a user selects one of the track mood descriptors 142, the subsequent menu of mood descriptors is customized to correspond to the previously selected descriptor. For example, where a user selects the mood descriptor Dark from a first menu, a subsequent menu may include the descriptor Depressed but may exclude the descriptor Bright, which may be unlikely to be associated with a Dark story.

Figure 11:
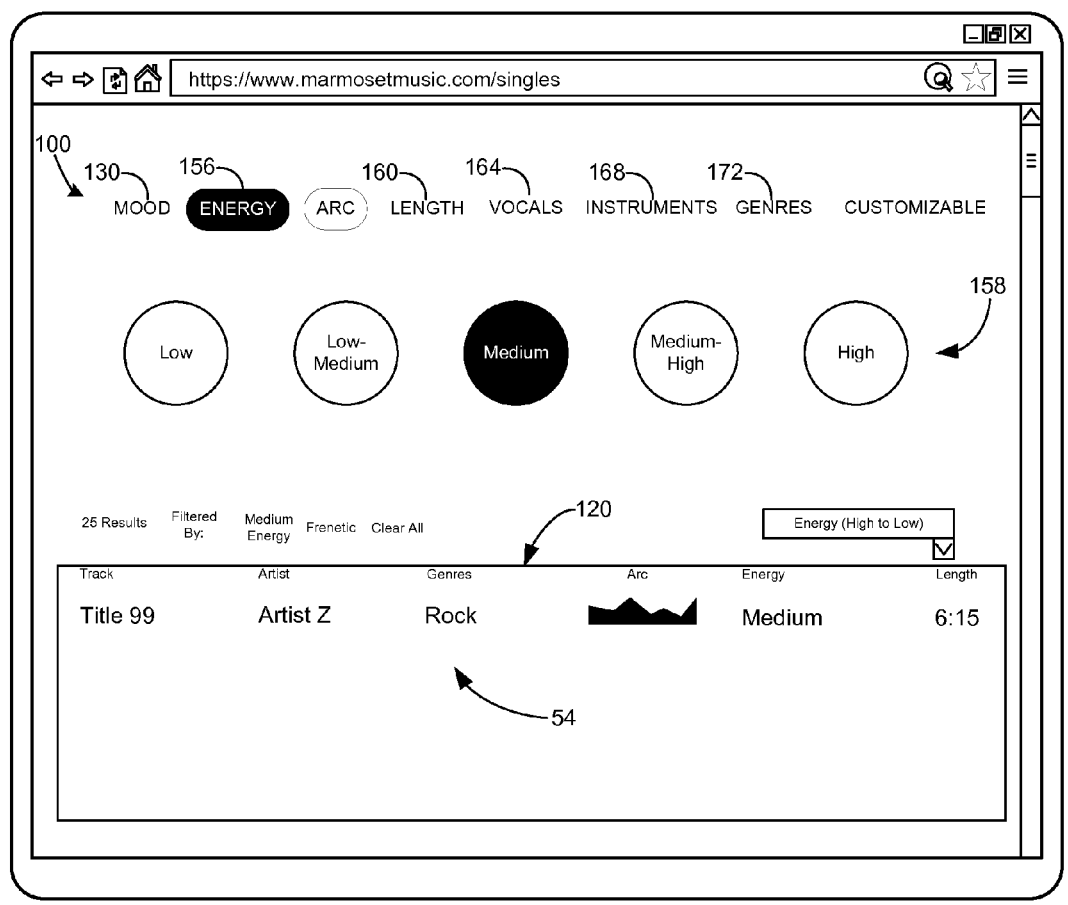
FIG. 11 is a schematic view of a musical soundtrack matching graphical user interface displayed on a user computing device according to another example of the present disclosure.

In some examples and with reference now to FIG. 11, the musical soundtrack matching GUI 100 may include an energy selector 156. When a user selects the energy selector 156, the musical soundtrack matching GUI 100 may display a plurality of energy descriptor selectors 158 that correspond to an energy level of a musical track. For example, the menu of energy descriptor selectors 158 may include Low, Low-Medium, Medium, Medium-High, and High. It will be appreciated that fewer or more energy descriptors may also be provided. Upon a selection of a desired energy descriptor selector 158, the musical soundtrack matching program 28 may identify those musical tracks 44 that embody such an energy descriptor, as well as the selected musical arc and any other track characteristics selected by the user.

In some examples, a musical arc graphical representation may comprise one or more user-selectable nodal points that are moveable in an x-axis and/or a y-axis direction. In this manner, the musical soundtrack matching GUI 100 may allow the user to manipulate one or more nodal points of a musical arc graphical representation. The nodal points correspond to inflection points along the x-axis where the musical arc rises and falls at specific times. In this manner, the user may create a customized musical arc to match the specific timing points of their story.

Figure 12:
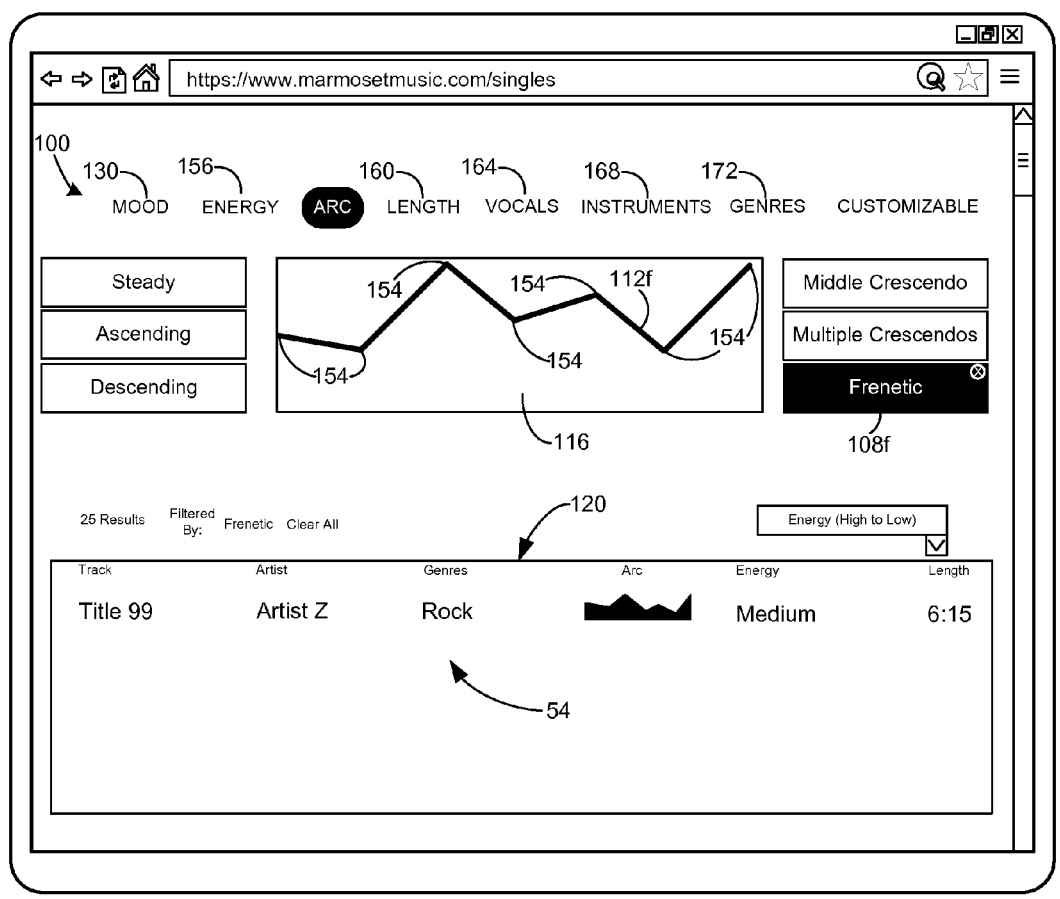
FIG. 12 is a schematic view of a musical soundtrack matching graphical user interface displayed on a user computing device according to another example of the present disclosure.

For example and with reference to FIG. 12, one or more nodal points 154 of the musical arc graphical representation 112*f* may be selectable and movable in the x-axis and/or y-axis direction to allow the user to customize the flow and timing of the musical arc graphical representation. In some examples, the musical soundtrack matching GUI 100 may integrate an energy level along the y-axis of the track box 116, such that the user may manipulate the level and amount of energy to match the emotion in their narrative.

In other examples, one or more additional track characteristic selectors may also be provided by the musical soundtrack matching GUI 100. In the example shown in FIG. 12, such track characteristic selectors include Length 160 that enables the user to specify a desired length or range of lengths of a track, Vocals 164 that enables the user to specify vocals or no vocals, Instruments 168 that enables the user to specify one or more prominent instruments included in the desired track, and Genres 172 that enables the user to select one or more musical genres for the desired track. Upon a selection of one or more additional track characteristic selectors, the musical soundtrack matching program 28 may identify those musical tracks 44 that embody such descriptors as well as the selected musical arc.

FIGS. 13A and 13B illustrate a flow chart of a method 1300 for providing a musical soundtrack matching GUI to a user computing device according to an example of the present disclosure. The following description of method 1300 is provided with reference to the software and hardware components and musical soundtrack matching GUI 100 described above and shown in FIGS. 1-12 and 15. It will be appreciated that method 1300 may also be performed in other contexts using other suitable hardware and software components.

With reference to FIG. 13A, at 1302 the method 1300 may include sending the musical soundtrack matching GUI to the user computing device, with the musical soundtrack matching GUI comprising a plurality of user-selectable musical arc descriptor selectors that each correspond to a different one of a plurality of musical arc characteristics, and a results region. At 1306 the plurality of user-selectable musical arc descriptor selectors may be selected from the group consisting of a steady musical arc descriptor, an ascending musical arc descriptor, a descending musical arc descriptor, a middle crescendo musical arc descriptor, a multiple crescendo musical arc descriptor, and a frenetic musical arc descriptor. At 1310 the method 1300 may include receiving input of a musical arc descriptor selection of one of the user-selectable musical arc descriptor selectors.

At 1314 the method 1300 may include, in response to receiving the musical arc descriptor selection, searching for one or more musical tracks that embody the musical arc descriptor selection. At 1318 the method 1300 may include, in response to receiving the musical arc descriptor selection, causing the musical soundtrack matching graphical user interface to display a musical arc graphical representation that visually depicts the musical arc descriptor selection. At 1322 the musical arc graphical representation may comprise a line that extends from left to right in a manner that visually depicts a flow of a musical track. At 1326 the musical arc graphical representation may comprise one or more user-selectable nodal points that are moveable in an x-axis direction and/or a y-axis direction.

At 1330 the method 1300 may comprise sending to the user computing device results identifying the one or more musical tracks that embody the musical arc descriptor selection. At 1334 the method 1300 may comprise causing the musical soundtrack matching GUI to display in the results region the results identifying the one or more musical tracks that embody the musical arc descriptor selection. With reference now to FIG. 13B, at 1338 the musical soundtrack matching graphical user interface may comprise a musical arc icon corresponding to the musical arc descriptor selection, wherein the musical arc icon is displayed with each of the musical tracks in the results region.

At 1342 the musical soundtrack matching GUI may comprise a user-selectable arc selector. At 1346 the method 1300 may comprise receiving input of a selection of the arc selector. At 1350 the method 1300 may comprise, in response to receiving the selection of the arc selector, causing the musical soundtrack matching graphical user interface to display the plurality of user-selectable musical arc descriptor selectors. At 1354 the musical soundtrack matching GUI may comprise a plurality of user-selectable mood selectors, wherein each of the user-selectable mood selectors corresponds to a different one of a plurality of musical track mood descriptors. At 1358 the method 1300 may comprise receiving input of a selection of one of the user-selectable mood selectors. At 1362 the method 1300 may comprise, in response to receiving the selection of the user-selectable mood selector, causing the musical soundtrack matching graphical user interface to display in the results region one or more musical tracks that embody both the musical arc descriptor selection and the mood selection.

It will be appreciated that method 1300 is provided by way of example and is not meant to be limiting. Therefore, it is to be understood that method 1300 may include additional and/or alternative steps than those illustrated in FIGS. 13A and 13B. Further, it is to be understood that method 1300 may be performed in any suitable order. Further still, it is to be understood that one or more steps may be omitted from method 1300 without departing from the scope of this disclosure.

FIG. 14 illustrates a flow chart of a method 1400 for providing a musical soundtrack GUI according to another example of the present disclosure. The following description of method 1400 is provided with reference to the software and hardware components and musical soundtrack matching GUI 100 described above and shown in FIGS. 1-12 and 15. It will be appreciated that method 1400 may also be performed in other contexts using other suitable hardware and software components.

With reference to FIG. 14, at 1402 the method 1400 may include displaying the musical soundtrack matching GUI on a user computing device, where the musical soundtrack matching GUI comprises a plurality of user-selectable musical arc descriptor selectors that each correspond to a different one of a plurality of musical arc characteristics, and a results region. At 1406 the method 1400 may include receiving input of a musical arc descriptor selection of one of the user-selectable musical arc descriptor selectors.

At 1410 the method 1400 may include, in response to receiving the musical arc descriptor selection, receiving results identifying one or more musical tracks that embody the musical arc descriptor selection. At 1414 the method 1400 may include, in response to receiving the musical arc descriptor selection, causing the musical soundtrack matching graphical user interface to display a musical arc graphical representation that visually depicts the musical arc descriptor selection.

At 1418 the musical arc graphical representation may comprise a line that extends from left to right in a manner that visually depicts a flow of a musical track. At 1422 the musical arc graphical representation may comprise one or more user-selectable nodal points that are moveable in an x-axis direction and/or a y-axis direction. At 1426 the method 1400 may include displaying in the results region the results identifying the one or more musical tracks that embody the musical arc descriptor selection.

It will be appreciated that method 1400 is provided by way of example and is not meant to be limiting. Therefore, it is to be understood that method 1400 may include additional and/or alternative steps than those illustrated in FIG. 14. Further, it is to be understood that method 1400 may be performed in any suitable order. Further still, it is to be understood that one or more steps may be omitted from method 1400 without departing from the scope of this disclosure.

Advantageously and as described above, by generating the musical soundtrack matching GUI 100, the musical soundtrack matching program 28 translates the shape of the desired music into a visual image, read from left to right, that describes the flow of the music and how it can most accurately match the flow of the user's story. In this manner, the musical soundtrack matching program 28 enables non-musicians to work with music in a more intuitive, effective and accurate manner. In addition, when a user selects different musical arcs, the musical arc graphical representation 112 may move responsively to visually depict the different corresponding arc. Providing such a visual depiction enables users to easily and clearly understand how each musical arc corresponds to and affects the user's story differently, and to see in real time the visual differences between the various arcs.

Accordingly, the musical soundtrack matching GUI 100 of the present disclosure speaks to storytellers in their own language, the language of visuals, flow and purpose. Further, by providing users with an intuitive, easy-to-use solution for finding a musical track having a musical arc that closely matches the story arc of the user's story, the user may avoid the expense and delay of commissioning a custom score to match the musical arc with his or her story arc.

Figure 15:
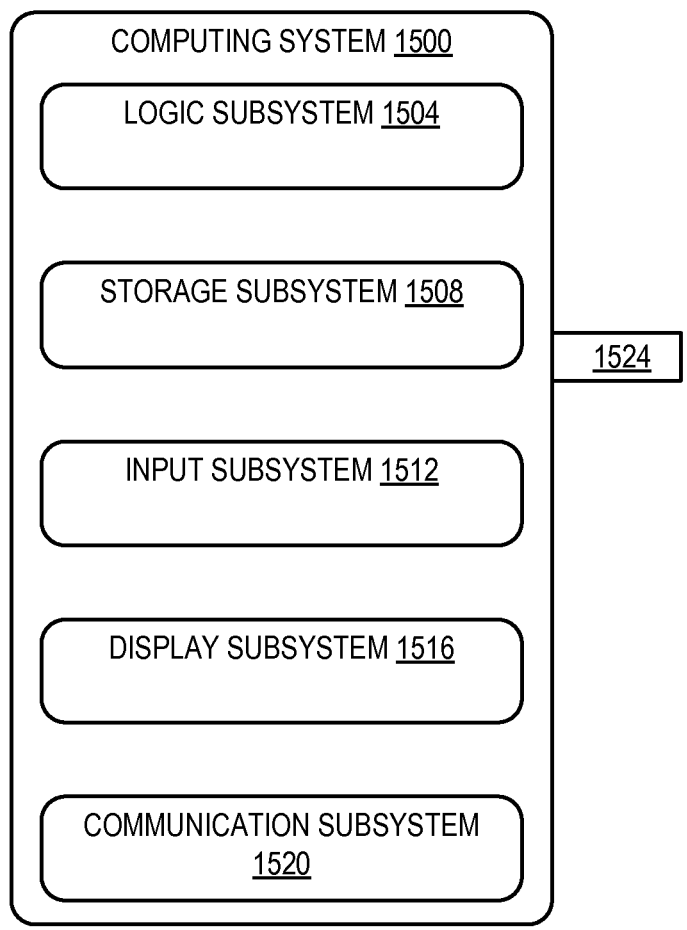
FIG. 15 is a simplified schematic illustration of an embodiment of a computing device.

FIG. 15 schematically shows a nonlimiting embodiment of a computing system 1500 that may perform one or more of the above described methods and processes. Computing system 1500 is shown in simplified form. It is to be understood that virtually any computer architecture may be used without departing from the scope of this disclosure. In different embodiments, computing system 1500 may take the form of a network computing device, a desktop computing device, a mobile computing device such as a tablet computer, laptop, notebook, smart phone, or other suitable type of computing device.

As shown in FIG. 15, computing system 1500 includes a logic subsystem 1504, a storage subsystem 1508 and an input subsystem 1512. Computing system 1500 may further include a display subsystem 1516, a communication subsystem 1520, and/or other subsystems and components not shown in FIG. 15. Computing system 1500 may also include computer readable media, with the computer readable media including computer readable storage media and computer readable communication media. Computing system 1500 may also optionally include other user input devices such as keyboards, mice, touchpads, and/or touch screens, for example. Further, in some embodiments the methods and processes described herein may be implemented as a computer application, computer service, computer API, computer library, and/or other computer program product.

Logic subsystem 1504 may include one or more physical devices configured to execute one or more instructions. For example, the logic subsystem 1504 may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The logic subsystem 1504 may include one or more processors that are configured to execute software instructions. Additionally or alternatively, the logic subsystem may include one or more hardware or firmware logic machines configured to execute hardware or firmware instructions. Processors of the logic subsystem may be single core or multicore, and the programs executed thereon may be configured for parallel or distributed processing.

Storage subsystem 1508 may include one or more physical, computer readable memory devices configured to hold data and/or instructions executable by the logic subsystem 1504 to implement the herein described methods and processes. When such methods and processes are implemented, the state of storage subsystem 1508 may be transformed (e.g., to hold different data).

Storage subsystem 1508 may include removable computer readable media devices and/or built-in computer readable memory devices. Storage subsystem 1508 may include optical computer readable memory devices (e.g., CD, DVD, HD-DVD, Blu-Ray Disc, etc.), semiconductor computer readable memory devices (e.g., RAM, EPROM, EEPROM, etc.) and/or magnetic computer readable memory devices (e.g., hard disk drive, floppy disk drive, tape drive, MRAM, etc.), among others. Storage subsystem 1508 may include devices with one or more of the following characteristics: volatile, nonvolatile, dynamic, static, read/write, read-only, random access, sequential access, location addressable, file addressable, and content addressable. The term "computer readable memory device" excludes propagated signals per se.

In some embodiments, aspects of logic subsystem 1504 and storage subsystem 1508 may be integrated into one or more common devices through which the functionally described herein may be enacted, at least in part. Such hardware-logic components may include field-programmable gate arrays (FPGAs), program- and application-specific integrated circuits (PASIC/ASICs), program- and application-specific standard products (PSSP/ASSPs), system-on-a-chip (SOC) systems, and complex programmable logic devices (CPLDs), for example.

FIG. 15 also shows an aspect of the storage subsystem 1508 in the form of removable computer readable memory device 1524, which may be used to store data and/or instructions executable to implement the methods and processes described herein. Removable computer readable memory device 1524 may take the form of an EEPROM such as a flash drive, CD, DVD, HD-DVD, Blu-Ray Disc, and/or floppy disk, among others.

In some embodiments, aspects of the instructions described herein may be propagated by a pure signal (e.g., an electromagnetic signal, an optical signal, etc.) via a transmission medium, rather than a computer readable memory device. Furthermore, data and/or other forms of information pertaining to the present disclosure may be propagated by a pure signal via computer readable communication media.

Input subsystem 1512 may comprise or interface with one or more user-input devices such as a keyboard, mouse, touchpad, touch screen, microphone, camera, etc.

Display subsystem 1516 may be used to present a visual representation of data held by storage subsystem 1508. As the above described methods and processes change the data held by the storage subsystem 1508, and thus transform the state of the storage subsystem, the state of the display subsystem 1516 may likewise be transformed to visually represent changes in the underlying data. The display subsystem 1516 may include one or more display devices, such as displays 26, utilizing virtually any type of technology. Such display devices may be combined with logic subsystem 1504 and/or storage subsystem 1508 in a shared enclosure.

Communication subsystem 1520 may be configured to communicatively couple computing system 1500 with one or more networks and/or one or more other computing devices, such as one or more databases that store musical tracks. Communication subsystem 1520 may include wired and/or wireless communication devices compatible with one or more different communication protocols. As nonlimiting examples, the communication subsystem 1520 may be configured for communication via a wireless telephone network, a wireless local area network, a wired local area network, a wireless wide area network, a wired wide area network, etc.

The term "program" may be used to describe an aspect of the present disclosure that is implemented to perform one or more particular functions. In some cases, such a program may be instantiated via logic subsystem 1504 executing instructions held by storage subsystem 1508. It is to be understood that different programs may be instantiated from the same application, service, code block, object, library, routine, API, function, etc. Likewise, the same program may be instantiated by different applications, services, code blocks, objects, routines, APIs, functions, etc. The term "program" is meant to encompass individual or groups of executable files, data files, libraries, drivers, scripts, database records, etc.

It is to be understood that the configurations and/or approaches described herein are exemplary in nature, and that these specific embodiments or examples are not to be considered in a limiting sense. The specific routines or methods described herein may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

It will also be appreciated that references to "one embodiment" or "an embodiment" are not intended to be interpreted as excluding the existence of additional embodiments that also incorporate the recited features. Unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," and "second," etc. are used merely as labels, and are not intended to impose numerical requirements or a particular positional order on their objects.

The invention claimed is:

1. A host computing device, comprising:
a communication subsystem for communicatively coupling the host computing device to one or more user computing devices;
a logic subsystem; and
a storage subsystem containing instructions executable by the logic subsystem to send a musical soundtrack matching graphical user interface to the one or more user computing devices, the musical soundtrack matching graphical user interface comprising:

a plurality of user-selectable musical arc descriptor selectors configured to receive input of a user-selected musical arc descriptor selection, wherein each of the user-selectable musical arc descriptor selectors corresponds to a different volume flow from beginning to end of a musical track;

a musical arc graphical representation that visually depicts the user-selected musical arc descriptor selection corresponding to the volume flow from beginning to end of a musical track, the musical arc graphical representation comprising a line that extends from left to right in a manner that visually depicts the volume flow from beginning to end of a musical track; and a results region displaying one or more musical tracks that embody the user-selected musical arc descriptor selection.

2. The host computing device of claim 1, wherein the musical arc graphical representation further comprises one or more user-selectable nodal points that are moveable in an x-axis and/or a y-axis direction.

3. The host computing device of claim 1, wherein the musical soundtrack matching graphical user interface further comprises a musical arc icon that visually corresponds to the user-selected musical arc descriptor selection, wherein the musical arc icon is displayed with each of the one or more musical tracks in the results region.

4. The host computing device of claim 1, wherein the musical soundtrack matching graphical user interface further comprises a user-selectable arc selector that is configured to receive input and, upon receipt of the input, to display the plurality of user-selectable musical arc descriptor selectors.

5. The host computing device of claim 1, wherein the plurality of user-selectable musical arc descriptor selectors are selected from the group consisting of a steady musical arc descriptor, an ascending musical arc descriptor, a descending musical arc descriptor, a middle crescendo musical arc descriptor, a multiple crescendo musical arc descriptor, and a frenetic musical arc descriptor.

6. The host computing device of claim 1, wherein the musical soundtrack matching graphical user interface further comprises a plurality of user-selectable mood selectors configured to receive input of a user-selected mood selection, wherein each of the user-selectable mood selectors corresponds to a different one of a plurality of musical track mood descriptors, and wherein the results region displays one or more musical tracks that embody both the user-selected musical arc descriptor selection and the user-selected mood selection.

7. A method for providing a musical soundtrack matching graphical user interface to a user computing device, the method comprising:

sending the musical soundtrack matching graphical user interface to the user computing device, the musical soundtrack matching graphical user interface comprising:

a plurality of user-selectable musical arc descriptor selectors that each correspond to a different volume flow from beginning to end of a musical track;

a musical arc graphical representation that visually depicts a user-selected musical arc descriptor selection corresponding to the volume flow from beginning to end of a musical track, the musical arc graphical representation comprising a line that extends from left to right in a manner that visually depicts the volume flow from beginning to end of a musical track; and a results region;

receiving input of a musical arc descriptor selection of one of the user-selectable musical arc descriptor selectors;

in response to receiving the musical arc descriptor selection, searching for one or more musical tracks that embody the musical arc descriptor selection;

sending to the user computing device results identifying the one or more musical tracks that embody the musical arc descriptor selection; and causing the musical soundtrack matching graphical user interface to display in the results region the results identifying the one or more musical tracks that embody the musical arc descriptor selection.

8. The method of claim 7, wherein the musical arc graphical representation further comprises one or more user-selectable nodal points that are moveable in an x-axis direction and/or a y-axis direction.

9. The method of claim 7, wherein the musical soundtrack matching graphical user interface further comprises a musical arc icon corresponding to the musical arc descriptor selection, wherein the musical arc icon is displayed with each of the one or more musical tracks in the results region.

10. The method of claim 7, wherein the musical soundtrack matching graphical user interface further comprises a user-selectable arc selector, the method further comprising:

receiving input of a selection of the arc selector; and in response to receiving the selection of the arc selector, causing the musical soundtrack matching graphical user interface to display the plurality of user-selectable musical arc descriptor selectors.

11. The method of claim 7, wherein the plurality of user-selectable musical arc descriptor selectors are selected from the group consisting of a steady musical arc descriptor, an ascending musical arc descriptor, a descending musical arc descriptor, a middle crescendo musical arc descriptor, a multiple crescendo musical arc descriptor, and a frenetic musical arc descriptor.

12. The method of claim 7, wherein the musical soundtrack matching graphical user interface further comprises a plurality of user-selectable mood selectors, wherein each of the user-selectable mood selectors corresponds to a different one of a plurality of musical track mood descriptors, the method further comprising:

receiving input of a selection of one of the user-selectable mood selectors; and in response to receiving the selection of the user-selectable mood selector, causing the musical soundtrack matching graphical user interface to display in the results region one or more musical tracks that embody both the musical arc descriptor selection and the mood selection.

13. A method for providing a musical soundtrack matching graphical user interface, the method comprising:

displaying the musical soundtrack matching graphical user interface on a user computing device, the musical soundtrack matching graphical user interface comprising:

a plurality of user-selectable musical arc descriptor selectors that each correspond to a different volume flow from beginning to end of a musical track;

a musical arc graphical representation that visually depicts a user-selected musical arc descriptor selection corresponding to the volume flow from beginning to end of a musical track, the musical arc graphical representation comprising a line that extends from left to right in a manner that visually depicts the volume flow from beginning to end of a musical track; and a results region;

receiving input of a musical arc descriptor selection of one of the user-selectable musical arc descriptor selectors;

in response to receiving the musical arc descriptor selection, receiving results identifying one or more musical tracks that embody the musical arc descriptor selection; and displaying in the results region the results identifying the one or more musical tracks that embody the musical arc descriptor selection.

14. The method of claim 13, wherein the musical arc graphical representation further comprises one or more user-selectable nodal points that are moveable in an x-axis direction and/or a y-axis direction.

\* \* \* \* \*